(12) United States Patent
Sørensen

(10) Patent No.: US 11,300,100 B2
(45) Date of Patent: Apr. 12, 2022

(54) WIND TURBINE SYSTEM WITH IMPROVED STABILITY DURING SHUTDOWN

(71) Applicant: VESTAS WIND SYSTEMS A/S, Aarhus N (DK)

(72) Inventor: Kim Hylling Sørensen, Århus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 426 days.

(21) Appl. No.: 16/303,946

(22) PCT Filed: May 24, 2017

(86) PCT No.: PCT/EP2017/062597
§ 371 (c)(1),
(2) Date: Nov. 21, 2018

(87) PCT Pub. No.: WO2017/202945
PCT Pub. Date: Nov. 30, 2017

(65) Prior Publication Data
US 2020/0318613 A1  Oct. 8, 2020

(30) Foreign Application Priority Data

May 26, 2016 (DK) .............................. PA201670358

(51) Int. Cl.
*F03D 7/02* (2006.01)
*F03D 1/02* (2006.01)
*F03D 7/04* (2006.01)

(52) U.S. Cl.
CPC .............. *F03D 7/0296* (2013.01); *F03D 1/02* (2013.01); *F03D 7/0224* (2013.01); *F03D 7/0264* (2013.01); *F03D 7/042* (2013.01)

(58) Field of Classification Search
CPC .... F03D 7/0296; F03D 7/0224; F03D 7/0264; F03D 7/042; F03D 1/02; Y02E 10/72
See application file for complete search history.

(56) References Cited

U.S. PATENT DOCUMENTS

2003/0168864 A1   9/2003 Heronemus et al.
2003/0170123 A1*  9/2003 Heronemus ............. F03D 13/20
                                                                  416/41
(Continued)

FOREIGN PATENT DOCUMENTS

CN        102767476 A       11/2012
CN        104619983 A        5/2015
(Continued)

OTHER PUBLICATIONS

Chinese Office Action for Application No. 201780046257.2 dated Nov. 5, 2019.
(Continued)

*Primary Examiner* — Woody A Lee, Jr.
*Assistant Examiner* — Eric A Lange
(74) *Attorney, Agent, or Firm* — Patterson + Sheridan, LLP

(57) ABSTRACT

The invention relates to a wind turbine system with a plurality of wind turbine modules each with a rotor. A control system is arranged to execute a shutdown procedure with a first control command for terminating power production from a first subset of wind turbine modules resulting in a thrust force change with a reduced thrust force from the wind on a first part of the support structure carrying the first subset of wind turbine modules. A second control command is applied to a second subset of wind turbine modules for enabling thrust control of the second subset of wind turbine modules to oppose the thrust force change at the first part. Thus, there is obtained an improved and cost-effective way of stabilizing a wind turbine system with multiple rotors during shutdown.

15 Claims, 11 Drawing Sheets

(56) References Cited

U.S. PATENT DOCUMENTS

| | | | | |
|---|---|---|---|---|
| 2010/0119369 A1* | 5/2010 | Risager | ................ | F03D 7/0224 |
| | | | | 416/1 |
| 2013/0127173 A1* | 5/2013 | Lee | ........................ | F03D 13/20 |
| | | | | 290/55 |
| 2013/0300123 A1 | 11/2013 | Li et al. | | |
| 2015/0167646 A1* | 6/2015 | Hammerum | ............ | F03D 13/20 |
| | | | | 416/1 |

FOREIGN PATENT DOCUMENTS

| | | | | |
|---|---|---|---|---|
| EP | 3394428 A1 | 10/2018 | | |
| GB | 2443886 A | * | 5/2008 | ............ F03D 13/25 |
| GB | 2443886 A | 5/2008 | | |
| WO | 2010098813 A1 | 9/2010 | | |
| WO | 2017202945 A1 | 11/2017 | | |

OTHER PUBLICATIONS

PCT Written Opinion of the International Searching Authority for Application No. PCT/EP2017/062597 dated Jan. 13, 2017.
Danish First Technical Examination for Application No. PA 2016 70358 dated Jan. 13, 2017.
PCT International Search Report for Application No. PCT/EP2017/062597 dated Aug. 28, 2017.
European Patent Office, Communication pursuant to Article 94(3) for Application 17 727 167.3-1007 dated Feb. 16, 2022.

* cited by examiner

WIND TURBINE SYSTEM WITH IMPROVED STABILITY DURING SHUTDOWN

FIELD OF THE INVENTION

The present invention relates to a wind turbine system, more particularly a wind turbine system with a plurality of wind turbine modules, wherein stability is improved during shutdown. The invention also relates to a corresponding method, and a corresponding computer program product and control system.

BACKGROUND OF THE INVENTION

The most common type of wind turbine is the three-bladed upwind horizontal-axis wind turbine (abbreviated HAWT). In this type of wind turbine, or wind turbine generator, the rotor with the corresponding blades is positioned at the front of a nacelle, the nacelle itself being mounted on top of a vertical wind turbine tower.

Alternatively, a wind turbine system with a plurality of wind turbine modules can be mounted to a support structure, for example with only a single tower supporting several wind turbine modules, the wind turbine modules can be mounted in several different layers in the vertical direction. Wind turbine systems of this kind are also known in the field as multi-rotor array-type wind turbines. These wind turbine systems have several advantages, in particular in connection with transport, upscaling, and flexibility compared to conventional HAWTs.

However, such wind turbine systems also have some disadvantages, in particular the mechanical stability will be more difficult to handle, for example because the wind turbine modules may interact with each other. The concept of multi-rotor array-type wind turbines has been known for some time, but the associated problems have unfortunately been a barrier for implementation on any significant commercial scale in the wind turbine industry.

It is expected that particularly during shutdown of such multi rotor wind turbine systems, the problems normally experienced on a conventional single rotor wind turbine during shutdown could even be worse for a multi rotor wind turbine systems. Thus, the safety and design requirements during shutdown for multi rotor wind turbine systems could be even more strict than hitherto for conventional single rotor wind turbines, thus representing yet another barrier for the wider commercial use of multi rotor wind turbine systems.

In particular because of gusts in the wind. Gust may be described as short or temporary non-periodic bursts of relatively strong wind typically in order of approximately 5-10 seconds as it is known within the wind turbine field, typically gusts are caused by turbulence in the wind. Gusts are particular important for wind turbine system with multiple rotors because at these instances, the loads will be at the highest level and the changes in load could be very high. For example, with unstable wind conditions with many gusts shutdown may be difficult, or even impossible, to perform safely for a multi rotor wind turbine system due to the operational maximum limits on loads and/or deviations imposed by the overall mechanical design of such multi rotor wind turbine systems.

Hence, an improved wind turbine system with multiple rotors would be advantageous, and in particular a wind turbine system with improved stability during shutdown of the wind turbine system.

SUMMARY OF THE INVENTION

It may be seen as an object of the present invention to provide a wind turbine system that solves the above mentioned problems with stability during shutdown of the wind turbine system.

The above described object is intended to be obtained in a first aspect of the invention by providing a wind turbine system, wherein the wind turbine system is comprising:
a support structure,
a plurality of wind turbine modules mounted to the support structure wherein each of the plurality of wind turbine modules comprises a rotor,
a control system,
wherein the control system is arranged to execute a shutdown procedure, the shutdown procedure comprising:
applying a first control command (1CC) to a first subset of wind turbine modules for terminating power production therefrom resulting in a thrust force change with a reduced thrust force from the wind on a first part of the support structure carrying the said first subset of wind turbine modules, and
applying a second control command (2CC) to a second subset of wind turbine modules positioned at a different position relative to the first subset of wind turbine modules, the second control command enabling thrust control (TC) of the second subset of wind turbine modules to oppose the said thrust force change.

More particularly, the first aspect relates to a wind turbine system, wherein the wind turbine system is comprising:
a support structure including a tower,
a plurality of wind turbine modules mounted to the support structure wherein each of the plurality of wind turbine modules comprises a rotor,
a control system,
wherein the control system is arranged to execute a shutdown procedure, the shutdown procedure comprising:
applying a first control command to a first subset of wind turbine modules for terminating power production therefrom resulting in a thrust force change with a reduced thrust force from the wind on a first part of the support structure carrying the said first subset of wind turbine modules, and
applying a second control command to a second subset of wind turbine modules positioned at a different position relative to the first subset of wind turbine modules, the second control command enabling thrust control of the second subset of wind turbine modules to oppose a change in bending moment around the tower root resulting from the said thrust force change from the wind on the first part of the support structure carrying the said first subset of wind turbine modules.

By 'to oppose the said thrust force change' may generally be understood to oppose a change in bending moment around the tower root resulting from the said thrust force change from the wind on the first part of the support structure carrying the said first subset of wind turbine modules.

It may further be understood that 'to oppose a change in bending moment around the tower root resulting from the said thrust force change from the wind on the first part of the support structure carrying the said first subset of wind turbine modules' may cover that the opposing bending moment around the tower root fully matches the bending moment around the tower root resulting from the force change (such as wherein there will be no resulting deflection in the tower, such as the top of the tower, around the tower root) and/or that the opposing bending moment around the tower root serves to damp an oscillation of the tower around the tower root (such as an oscillation resulting from the force change), such as via overdamping, critical damping or light damping.

By 'bending moment around the tower root' may be understood the bending moment applied to the tower with respect to a horizontal axis intersecting the tower root, such as a centre of the tower root, such as said horizontal axis being orthogonal to a wind direction.

'Tower root' is understood as is common in the art, and is in particular understood to denote a point or plane of fixation of the tower to a fixed structure, such as a surface of the earth or a seabed or a tower foundation.

The invention is particularly, but not exclusively, advantageous for obtaining a wind turbine system which may enable an improved and/or cost-effective way of stabilizing a wind turbine system with multiple rotors during shutdown because of the advantageous use of the second subset of wind turbine modules for thrust control to oppose the thrust force change on the first subset of wind turbine modules during shutdown, i.e. termination of their power production, normally causing a deflection on the part of the support structure where the first subset of wind turbine modules are mounted or carried, a deflection which may be detrimental to the wind turbine system if not mitigated or reduced, in particular if a gust event is happening during the shutdown with an extreme load situation for the wind turbine system. Estimates of the inventors point to the fact that a shutdown during a high wind or gust situation could be one of the most extreme load cases of such a wind turbine system i.e. a so-called design driver which is quite important to handle efficiently. The present invention therefore opens up for much improved stability of such a wind turbine system with multiple rotors during shutdown, the stability and avoidance of undesirable high loads being provided in manner not possible at all in conventional single wind turbines of the HAWT-type.

In turn, the present invention thereby facilitates new and advantageous designs of especially the support structure of such wind turbine systems with multiple rotors hitherto not conceivable in practical implementation, especially the possibility of performing shutdown in unstable and/or strong wind conditions. It is therefore expected that the present invention will be an important element in the actual operation of wind turbine systems with multiple rotors on a larger scale. It also worth emphasizing that the present invention can be implemented with a relatively low degree of complexity, which is important for wind turbine systems with multiple rotors providing a very cost-effective path of wind energy, inter alia due to the expected use of well-tested and mature wind turbine technology in the wind turbine modules in the wind turbine systems with multiple rotors.

When terminating the power production from the first subset of wind turbine modules, the thrust force on the first subset of wind turbine modules will for aerodynamic reasons be correspondingly reduced and this thrust force change will cause the part of the support structure carrying the first subset of wind turbine to initially respond to this thrust force change by deflecting towards an equilibrium position (against the wind direction). This deflection is however opposed by the thrust control from the second subset of wind turbine modules according to the present invention, i.e. the thrust control from the second subset of wind turbine modules is coordinated so as to reduce or mitigate this deflection in said part of the support structure, e.g. tower and/or arms where the wind turbine modules are mounted, where as it will be explained in more detail below. Thus, the deflection is effectively counteracted by the coordinated thrust force from the second subset of wind turbine modules. The amount of thrust control from the second subset of wind turbine modules may be coordinated based on 1) data of the thrust force change in the first subset of wind turbine modules, either measured directly or indirectly measured, and/or 2) by using modules or estimates of the resulting thrust force change in the first subset of wind turbine modules under the given external parameters, e.g. wind.

With respect to the concept of a 'control system', it is typically implemented by electronic means, e.g. in a dedicated computer system with corresponding inputs, typically from sensors and/or models or simulations, and resulting outputs to achieve and enforce control of the vibrations according to the present invention, but it may also be implemented mechanically in relatively non-complex systems.

With respect to the term 'shutdown', it is to be understood in the broadest sense of the word i.e. to include at least the act of stopping the operation or activity related to the power production at least for the first subset of wind turbine modules, though in some cases the present invention may be applied for terminating power production for all the wind turbine modules in a wind turbine system, possibly in multiple steps as it will be explained in more detail below. The process of terminating power production may be performed gradually, e.g. to minimize or mitigate load changes on the wind turbine system from the wind, but it may also be abrupt or performed within a short time period. The terminating of power production normally resulting in that the rotors of the first subset of wind turbine modules will not rotate anymore, however, in some embodiments the rotors of the first subset of wind turbine modules may rotate slowly without producing any significant level of power in a so-called idling mode of operation for stability reasons. The shutdown may be planned, e.g. for service/maintenance, or it may be unplanned i.e. due to emergency reasons such as failures (in the wind turbine system or externally, such as electrical grid failures/events) or wind changes (high or low wind).

With respect to the term 'thrust force', it is to be understood in the broadest sense of the word within aerodynamics for wind turbines i.e. the drive of a force from the wind upon the rotor in the wind direction. The thrust force may most suitable be described in the rotating coordinate system of the rotor, the thrust force on the rotor then being perpendicular to the plane of rotation. The thrust force is often called the 'aerodynamic thrust force' on the rotor. In the context of the present invention, the term 'thrust force' will further be understood to be the total thrust force on the rotor, which is in reality a summation of a force distribution over the rotor in that direction. For further reference, the skilled reader is referred for example to Wind Turbines—Fundamentals, Technologies, Application, Economics by Erich Hau, Springer Verlag, 2006, which is hereby incorporated by reference in its entirety, in particular Chapter 5 on Rotor Aerodynamics and Chapter 6 on Loads and Structural Stresses.

In some embodiments, the second subset of wind turbine modules may be positioned at a different vertical position, or several different vertical positions, relative to the first subset of wind turbine modules, thereby making it possible to perform a shutdown process at the various vertical positions in the wind turbine system in an efficient and well-controlled manner. The support structure, in particular the tower, where the wind turbine modules are mounted may to some degree resemble the moving pattern of a balancing stick affected by a disturbance force at the top tip, the present invention reducing or mitigating the amplitude of the movement.

Alternatively or additionally, the second subset of wind turbine modules may be positioned at a different horizontal position relative to the first subset of wind turbine modules, e.g. if several wind turbine modules from said first subset are mounted across a broad range of horizontal positions, possibly at the same height or at different heights, the present invention may beneficially be applied to oppose or reduce corresponding deflections in the support structure during a shutdown process of the first subset of wind turbine modules. Thus, if several wind turbine modules are mounted on an arm in a support structure in the same vertical height, the termination of power production and the associated thrust force change may induce undesirable oscillatory deflections along the arm, oscillatory deflections that the present invention may reduce or mitigate by providing thrust control in the second subset of wind turbine modules to successfully oppose or counteract.

Beneficially, the control system may be arranged for applying the second control command (2CC) by pitching blades on the rotors in, at least part of, the second subset of wind turbine modules for enabling thrust control according to the present invention. Pitch control of the rotors provides an efficient and direct way of thrust control, which is relatively easy to implement because pitch control is often already implemented in the wind turbine modules for maximum power production under most wind conditions. Alternatively, the thrust control of the second subset of wind turbine modules may be implemented by power or torque control and/or speed control of the rotors, as the skilled person would readily understand once the teaching and general principle of the present invention is comprehended.

In advantageous embodiments, the thrust control (TC) of the second subset of wind turbine modules to oppose the said thrust force change may actively dampen oscillations of the first part of the support structure carrying the said first subset of wind turbine modules. Thus, a control process, e.g. a closed-loop feedback process, using data indicative of a measure of the thrust force change and/or the resulting deflection in the support structure may be applied to time and/or shape the required trust control (TC) to actively dampen the oscillations in said first part of the support structure. With respect to these oscillations, it is to be understood that vibrations are generally speaking a mechanical phenomenon whereby oscillations occur about an equilibrium point. The oscillations may be periodic, such as the motion of a pendulum, or the oscillations may be random. Oscillations may also be described as free oscillations or forced oscillations, as it is well known from vibration analysis in mechanics. With respect to the related term 'damping' of vibrations or oscillations, it is to be understood to include at least reducing, restricting and/or preventing of such oscillations. In many physical systems, damping is produced by operations and/or processes that dissipate the energy stored in the oscillation.

According to an embodiment, there is presented a wind turbine system, wherein
the first subset of wind turbine modules comprises a plurality of wind turbine modules, and
the second subset of wind turbine modules comprises a plurality of wind turbine modules.

In a second aspect, the present invention relates to a method for executing a wind turbine system transition from an active state of power production to inactive state with a shutdown procedure, the wind turbine system comprising:
a support structure,
a plurality of wind turbine modules mounted to the support structure wherein each of the plurality of wind turbine modules comprises a rotor, and
a control system,
wherein the method comprises:
applying a first control command (1CC) to a first subset of wind turbine modules for terminating power production therefrom resulting in a thrust force change with a reduced thrust force from the wind on a first part of the support structure carrying the said first subset of wind turbine modules, and
applying a second control command (2CC) to a second subset of wind turbine modules positioned at a different position relative to the first subset of wind turbine modules, the second control command enabling thrust control (TC) of the second subset of wind turbine modules to oppose the said thrust force change.

More particularly, according to the second aspect, there is provided method for executing a wind turbine system transition from an active state of power production to inactive state with a shutdown procedure, the wind turbine system comprising:
a support structure including a tower,
a plurality of wind turbine modules mounted to the support structure wherein each of the plurality of wind turbine modules comprises a rotor, and
a control system,
wherein the method comprises:
applying a first control command to a first subset of wind turbine modules for terminating power production therefrom resulting in a thrust force change with a reduced thrust force from the wind on a first part of the support structure carrying the said first subset of wind turbine modules, and
applying a second control command to a second subset of wind turbine modules positioned at a different position relative to the first subset of wind turbine modules, the second control command enabling thrust control of the second subset of wind turbine modules to oppose a change in bending moment around the tower root resulting from the said thrust force change from the wind on the first part of the support structure carrying the said first subset of wind turbine modules.

In a third aspect, the invention relates to a computer program product having instructions which, when executed cause a computing device or a computing system, such as a control system, preferably a shutdown control system, to perform a method according the second aspect.

In a fourth aspect, the invention relates to control system for controlling a wind turbine system, said control system being arranged for controlling said wind turbine system according to a method according to the second aspect.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DESCRIPTION OF EMBODIMENTS

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1A:
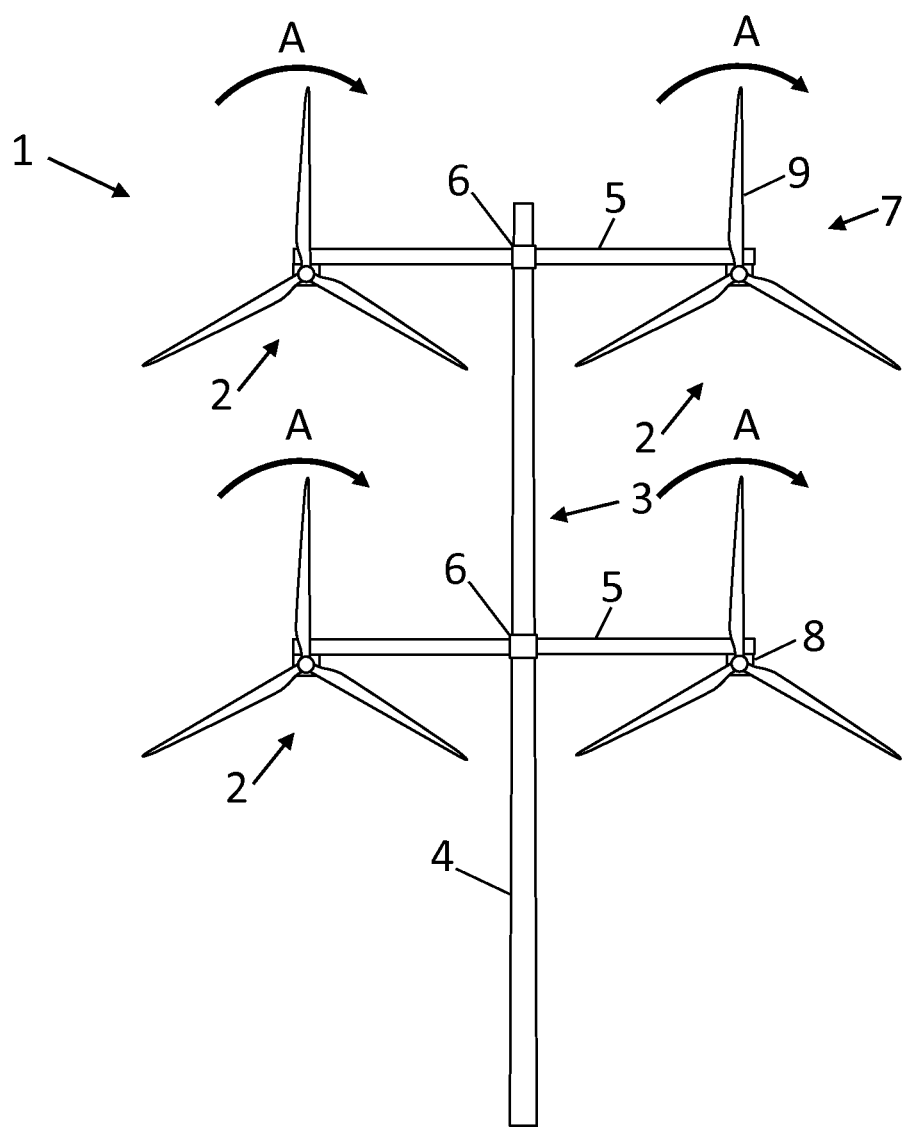
FIGS. 1A and 1B depict various wind turbine systems according to the present invention.

FIG. 1A depicts a wind turbine system 1, wherein the wind turbine system is comprising:

a support structure 3 including a tower 4 and arms 5 mounted to the tower 4 at junctions 6, a plurality of wind turbine modules 2 mounted to the support structure 3 wherein each of the plurality of wind turbine modules comprises a rotor 7 with blades 9.

Figure 2:
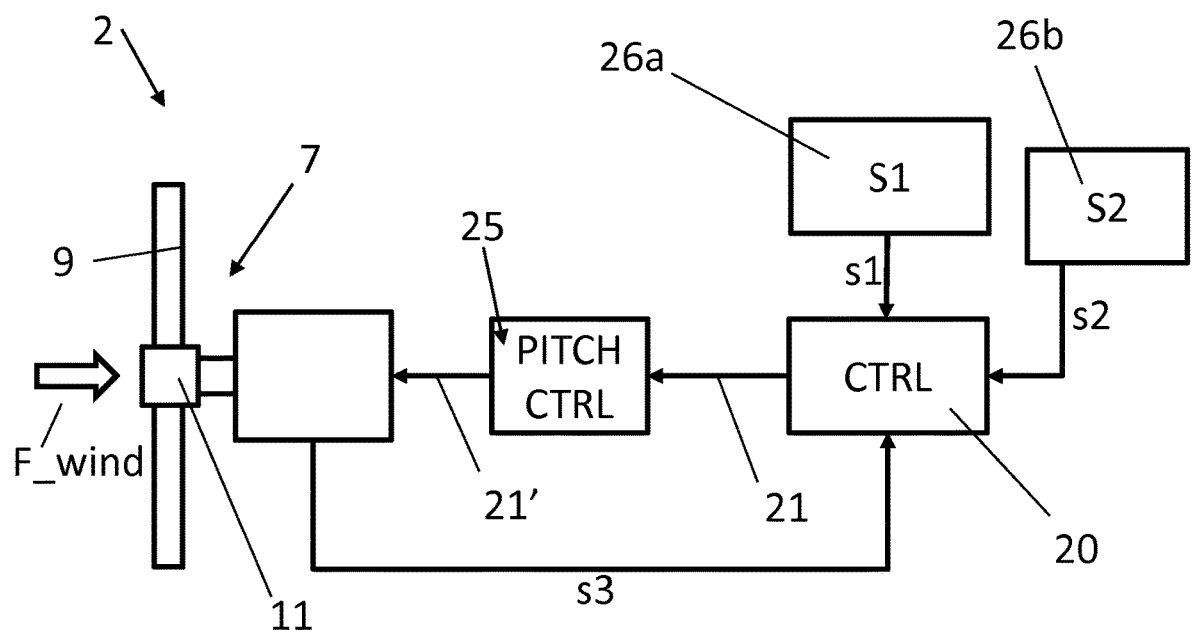
FIG. 2 shows a part of a wind turbine system according to the present invention.

The wind turbine system further comprises a control system 20 as shown in FIG. 2 as described further below. The control system 20 is arranged to execute a shutdown procedure by applying a number of control commands according to the present invention. The control system for implementing the present invention may therefore be part of a shutdown system, possibly a safety shutdown system, or be integrated with such as a shutdown system.

In the present embodiment, the support structure 3 comprises arms 5 extending outwards from the tower 4, each of the plurality of wind turbines modules being mounted on an end part of a corresponding arm. Furthermore, FIG. 1A depicts a nacelle 8 for each wind turbine module 2. FIG. 1A shows a support structure with two arms 5 each having two wind turbine modules 2 mounted thereon, but other embodiments are of course conceivable, e.g., four arms with four wind turbine modules each or three arms with lower, middle and upper arm, respectively having six, four and two wind turbine modules. The wind turbine modules 2 may be in the same vertical plane, or they may be shifted relative to each other.

In the wind turbine modules 2, the kinetic energy of the wind is converted into electrical energy by a power generation system (not shown), as it will be readily understood by a person skilled in wind turbines. As indicated by the four arrows A in FIG. 1A the rotors are rotating, and the wind turbine modules 2 are thus all operational and producing power from the wind, i.e. the wind turbine system is not shutdown or stopped.

Figure 1B:
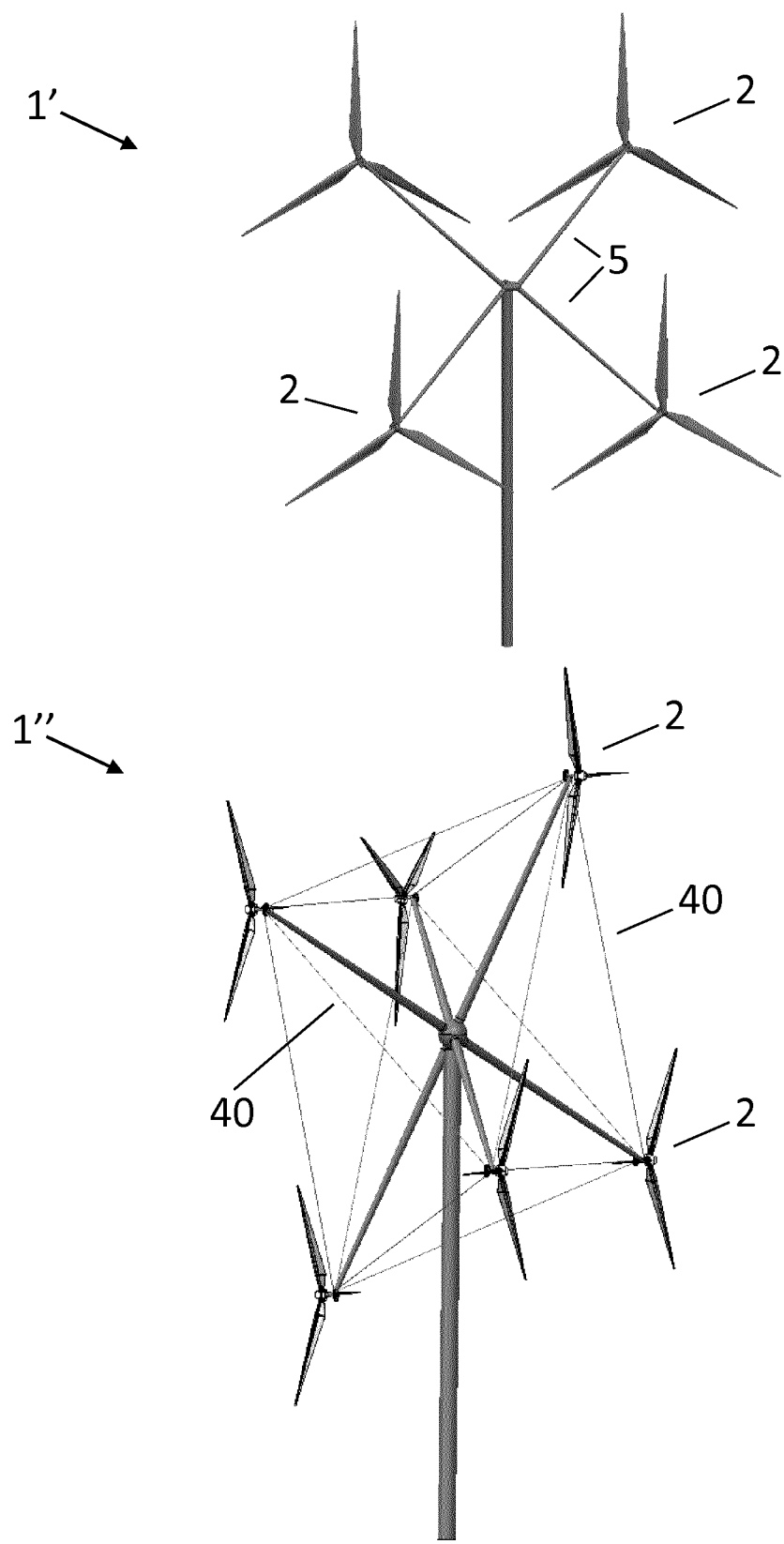

In FIG. 1B, some other embodiments of a wind turbine system 1 and 1" according to the invention are shown, but other embodiments are of course conceivable, e.g., four arms with four wind turbine modules each or three arms with lower, middle and upper arm, respectively having six, four and two wind turbine modules. Also higher numbers of wind turbine modules are contemplated within the teaching and principle of the present invention, e.g. 7, 8, 9, 10, 11, 12, 13, 14, 15, 16, 17, 18, 19 or 20 etc. wind turbine modules may be mounted on a support structure in various design configurations.

In the upper wind turbine system 1' in FIG. 1B, four arms 5 are extending from a common junction on the tower in substantially the same vertical plane, two arms pointing upwards and two arms pointing downwards from the junction.

The wind turbine modules may be in the same vertical plane, or they may be shifted in the wind direction relative to each other as for example with the lower wind turbine system 1". Thus, in the wind turbine system 1" six arms are extending from a common junction on the tower, three arms pointing forward relative to the junction and three arms pointing backwards from the junction. As schematically shown the wind turbine modules 2 may—in addition to arms—be mechanically supported by connecting means 40 directly between the wind turbine modules 2 for increased stability, e.g. by using wires, rods, bars, or similar. In the wind turbine system 1", not all the blades on the modules 2 are shown for reason of clarity.

In FIG. 2, the wind turbine system 1 further comprises a control system CTRL as schematically shown with the forces of the wind F_wind is acting on just one wind turbine module 2 for simplicity. FIG. 2 shows a part of a wind turbine system wherein the control system 20 is arranged for pitching rotor blades 9 on the rotors 7 (where each rotor 7 comprises a hub 11 which rotor blades 9 are attached to) by active damping oscillations resulting from the shutdown i.e. the control system is implementing a control process, e.g. a closed control loop, where input data is used as feedback, as the skilled person on control theory will readily understand, in order to oppose the thrust force change resulting from the shutdown.

The control system 20 of the wind turbine system comprises an input arrangement, e.g. corresponding data ports and sections, for receiving data, s1, s2, and s3, associated with the plurality of wind turbines modules 2 and/or the support structure 3, the data being related to any deflection of the support structure caused by the shutdown. By way of example, in FIG. 2 the data s1 and s2 originates from sensor S1 26a and S2 26b, respectively, whereas other data s3 comes from the nacelle. The data s1 could for example be load data from the support structure 3 obtained from suitable gauges/sensors (not shown), whereas data s2 could be related vibration data from the support structure. The data s3 could for example be load data from the rotor blades 9 (from one, more or all of them). The control system 20 and 25 is operably connected to the input arrangement for receiving data, s1, s2 and s3. The control system 20 and 25 is also configured to determine commands 21 and 21' for a particular wind turbine module 2' and/or 2" of the plurality of wind turbines modules 2. The command 21' is a pitch command for pitching the rotor blade 9 to a specific pitch position Θ in FIG. 2. Needless to say, the control system 20 and 25 may generate commands for more than one wind turbine module 2' and 2", in particular for all of the wind turbine modules 2 in the wind turbine system 1.

The input arrangement can be operably connected to a sensor system, 26a and 26b, for measuring vibration data, s1, s2, and s3 associated with the plurality wind turbine modules and/or the support structure, preferably the sensor arrangement, 26a and 26b, comprises one, or more, sensor elements positioned on, at, or near the particular wind turbine module 2', e.g. accelerometers, vibrations sensors, gyros, position sensors, optical sensors or similar sensing means capable of yielding data related to the thrust force change on the support structure and/or the resulting deflection of the support structure. More preferably, such sensor elements can be positioned on, or at, the rotor blades 9 of the wind turbine modules 2, and/or the support structure 3 and tower 4, possibly outside or below the support structure, e.g. optical sensors measuring deflection of the support structure at a distance from a ground position.

Thus, the wind turbine system may further comprises one, or more, sensors 26 positioned on, or near, said arms 5 extending from the support structure, the one, or more sensors on the arms providing deflection data s1, s2, and s3 to the control system, the control system having a control process for performing active damping based on said data, the data preferably being oscillation data for the support structure from the thrust force change during the shutdown.

Figure 3:
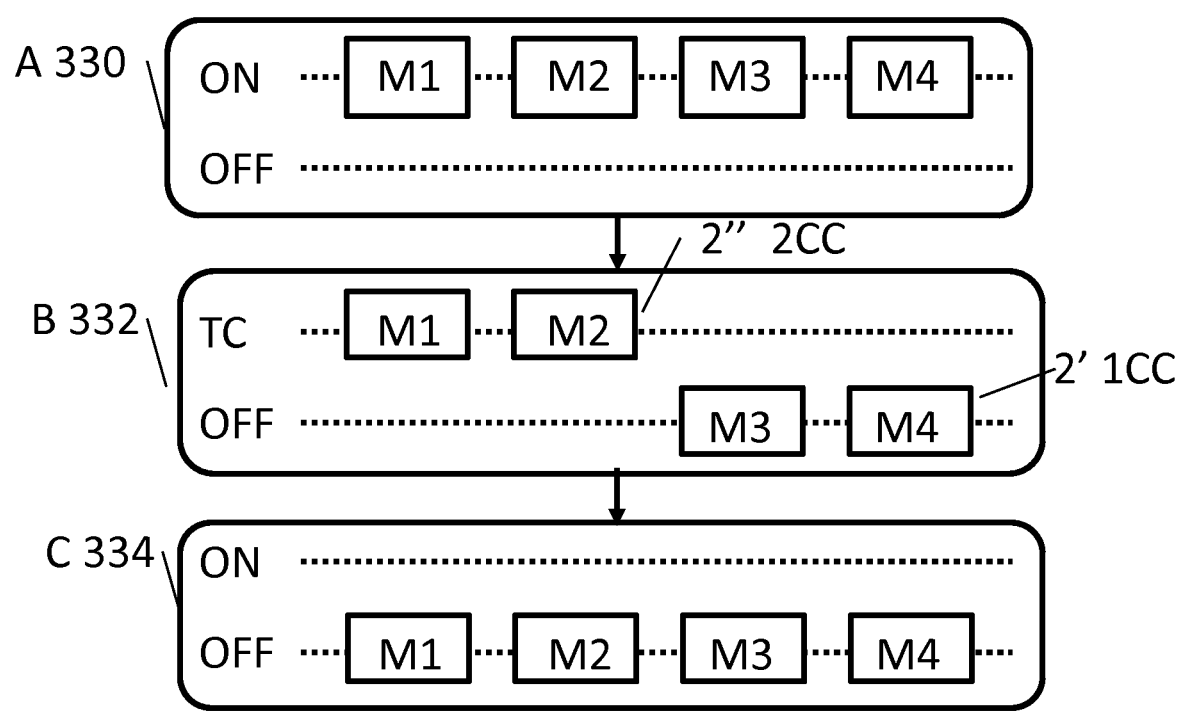
FIG. 3 shows a method for executing a shutdown of a wind turbine system according to the present invention.

FIG. 3 shows a method for executing a shutdown of a wind turbine system according to the present invention. The wind turbine system, as shown for illustrative purposes, comprises four wind turbine modules M1, M2, M3 and M4, which could be arranged on a support structure as shown in FIG. 1A or 1B, or any other configuration e.g. on a tower in four different heights, or on a tower with one horizontal arm etc., the skilled person would readily understand that the illustrated principle of the present is not limited to this specific embodiment.

In Step A 330, the wind turbine system 1 is operated with all of the wind turbine modules M1, M2, M3 and M4 in a state where they are producing power, as schematically illustrated with 'ON'.

In Step B 332, the wind turbine system has started a shutdown procedure where the wind turbine modules M3 and M4 form the first subset 2' of wind turbine modules, which has terminated their power production, as schematically illustrated with 'OFF'. This is implemented by applying the first control command 1CC to these two wind turbine modules M3 and M4 resulting in a thrust force change with a reduced thrust force from the wind on a first part of the support structure carrying this first subset of wind turbine modules. Furthermore, there is applied a second control command 2CC to a second subset of wind turbine modules 2" formed by wind turbine modules M1 and M2 positioned at a different position, e.g. below on the support structure as in FIG. 1A and FIG. 4, relative to the first subset of wind turbine modules 2', the second control command enabling thrust control TC of the second subset of wind turbine modules 2" to oppose the said thrust force change.

In Step C 334, the wind turbine system has finished a shutdown procedure where all the wind turbine modules M1-M4 have effectively terminated their power production, as schematically illustrated with all the modules being in the 'OFF' state. Thus, as compared to Step B 334, the modules of the second subset of wind turbine modules 2" M1 and M2 are also in a state where they have no power production. This OFF state for modules M1 and M2 may be entered when the deflection of the support structure has reached a certain level, where thrust control TC of the second subset of wind turbine modules 2" to oppose the said thrust force change by minimizing displacement from a nominal, or equilibrium, position is no longer required or recommended for safety or stability reasons.

Figure 4A:
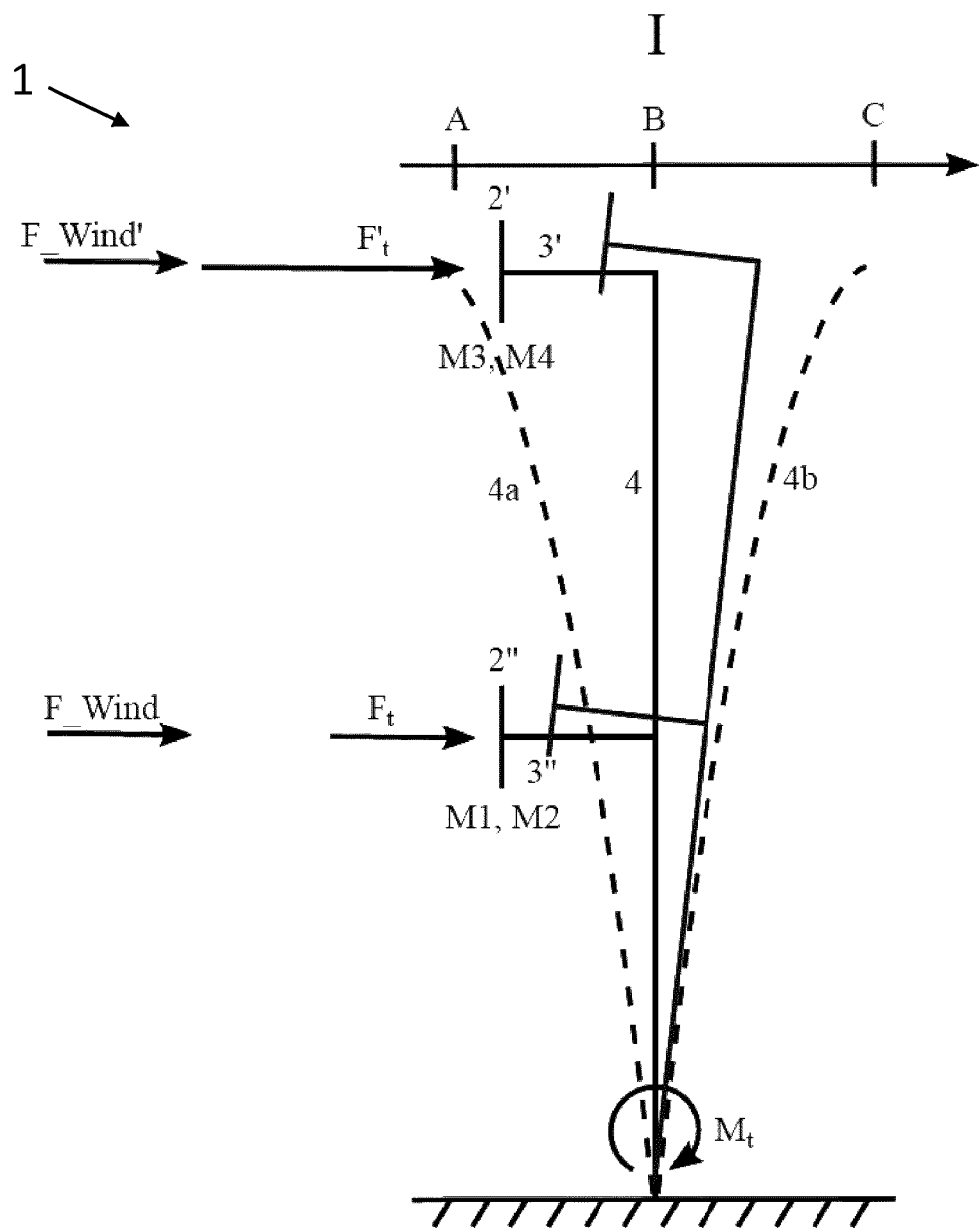
FIG. 4 shows two schematic side views of a wind turbine system during a deflection according to the present invention.
Figure 4B:
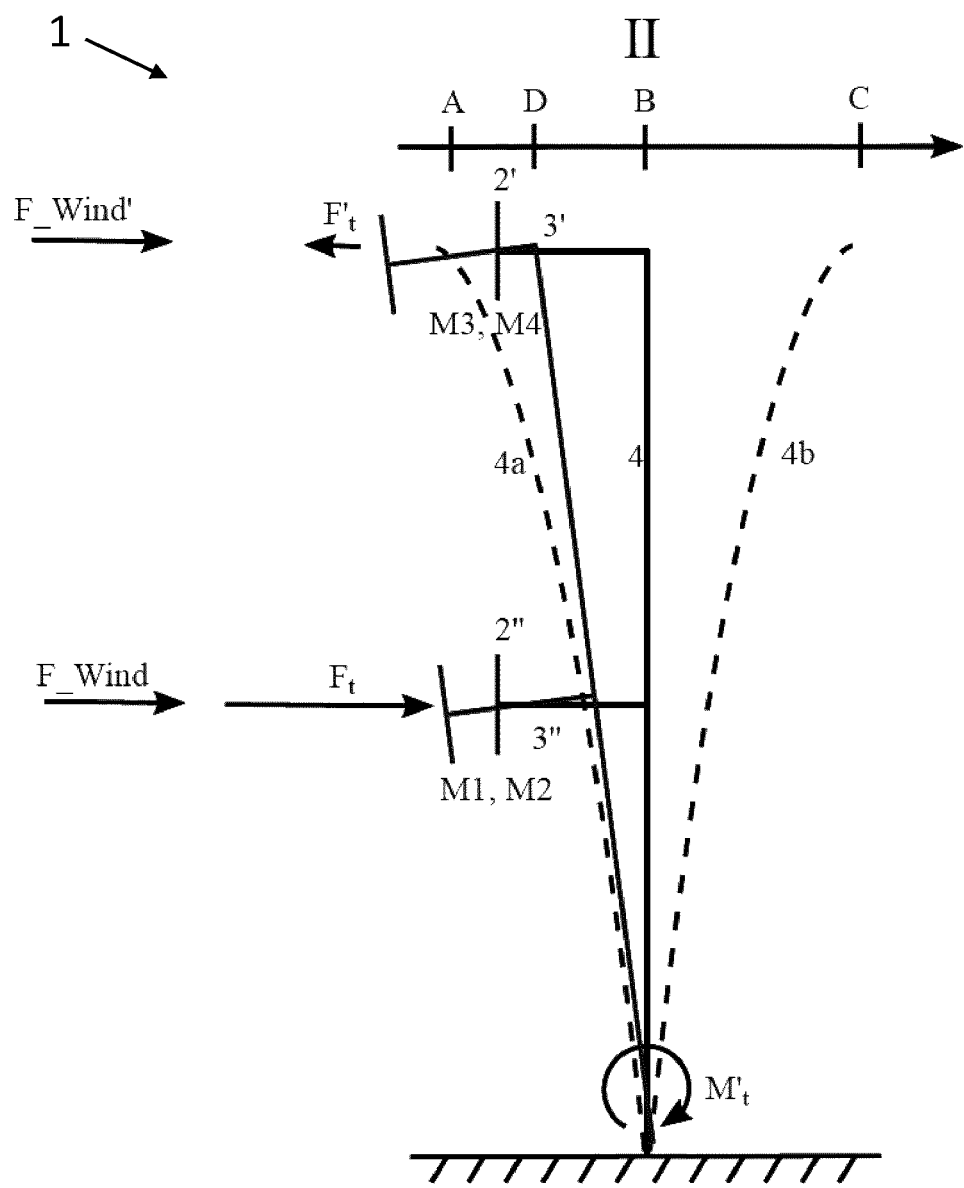

FIGS. 4A and 4B shows two schematic side views of a wind turbine system 1 during a deflection caused by a shutdown according to the present invention at two different times; I and II. The shown wind turbine system 1 is similar to the system shown in FIG. 1A, i.e. with two modules M3 and M4 mounted on an upper level 3' of the structure 3, the modules M3 and M4 thereby forming the first subset 2' where power production initially stops, and two modules M1 and M2 mounted on lower level 3" of the structure 3, the modules M1 and M2 forming the second subset 2" arranged to oppose the thrust force change resulting from the stop in power production from the upper level 3'. The deflection is exaggerated for illustrative purposes to explain the present invention more clearly.

In both FIGS. 4A and 4B, the forces of the wind are schematically indicated at the two levels by F_Wind and F_Wind'. For illustrative purposes, they are shown as being constant over time in the two figures, though the skilled person will readily know that the wind will change over time. The two forces of wind may be the same or different due to the height difference, or terrain effects. In both FIGS. 4A and 4B, the nominal, or equilibrium, position of the tower 4 is shown in position B in the upper axis indicating the deflection of the tower 4, or rather the top of the tower, and an additional deflected position of the tower away from position B. Thus, during normal power production the tower is deflected backwards to position 4b by the forces of the wind F_Wind and F_Wind' causing a thrust force on the wind turbine system 1, whereas during a shutdown the tower may then be deflected back and forth between positions 4b and 4a around the tower root with bending moment Mt (or M't in FIG. 4B) due to the elasticity of the tower. Unless interrupted, e.g. actively dampen, the oscillations of the support structure may be described by one, or more, Eigen frequencies of the support structure as the skilled person in vibration damping and mechanics will readily understand.

In FIG. 4A, the wind turbine system 1 is schematically indicated in a position where power production from modules M3 and M4 has just stopped and the tower 4 is moving upwind towards the nominal position B, though, because of the elasticity of the tower structure, it will not stop at the equilibrium position B but continue its movement towards deflection position A (or tower position 4a), while the present invention is implemented by opposing this movement of the tower by appropriately applying a counteracting thrust force $F_t$ by thrust control from the wind turbine modules M1 and M2. In the situation schematically shown in FIG. 4A, the upper thrust force $F'_t$ is larger than the thrust force $F_t$ from the modules M1 and M2, which may be happen shortly after the modules M3 and M4 have terminated their power production, though the thrust will generally be lower when the power production has terminated i.e. the thrust force $F'_t$ will generally change by being smaller in magnitude despite this short increase in the thrust force. Thus, the thrust force $F_t$ from the lower level may act as opposing force on this tower movement back and forth. Notice that the direction of the thrust force $F_t$ need not be opposite in direction relative to $F'_t$ at the upper level, but could just be lower in magnitude to oppose this deflection of the tower.

In FIG. 4B, the wind turbine system 1 is schematically indicated in a position D, where the tower has moved further upwind passing the nominal position B and is moving towards deflection position A (or tower position 4a). In FIG. 4B, the thrust force $F'_t$ acting on the upper level 3' is temporally negative i.e. against the wind. This can happen when the angle of attack is sufficiently small and the rotor blade is pitched quickly out of the wind resulting in a negative thrust. Thereafter, the thrust force F'$_t$ will typically be positive again i.e. in the wind direction. For opposing the deflection of the tower 4 there is applied a counteracting larger thrust force F$_t$ by thrust control at the wind turbine modules M1 and M2 at the lower level to counter this deflection and hence improve stability during the shutdown.

Various ways of performing active damping i.e. not only opposing the deflection may be implemented, e.g. first and second order damping as the skilled person in vibration damping and mechanics will readily comprehend once the general principle and teaching of the present invention is fully understood. When applying the second control command 2CC for enabling thrust control of the second subset of wind turbine modules 2", there will also be caused a corresponding displacement of the part 3" of the support structure carrying the second subset of wind turbine modules M3 and M4 when actively dampen the thrust force change on the first part 3' of the support structure, though the parts 3' and 3" are of course mechanically connected by the tower 4 as shown in FIG. 4.

Figure 5:
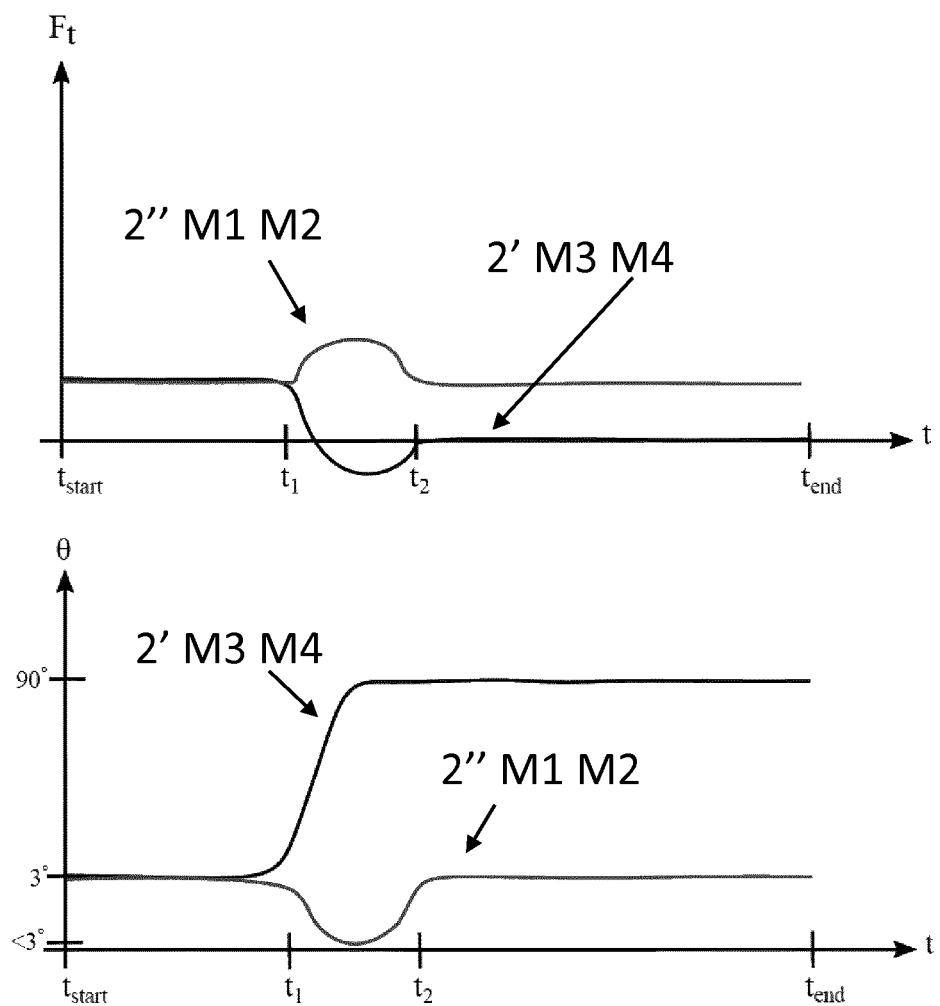
FIGS. 5 and 6 shows a graph of the pitching angle and the thrust force for a shutdown with and without gust, or high wind, respectively.
Figure 6:
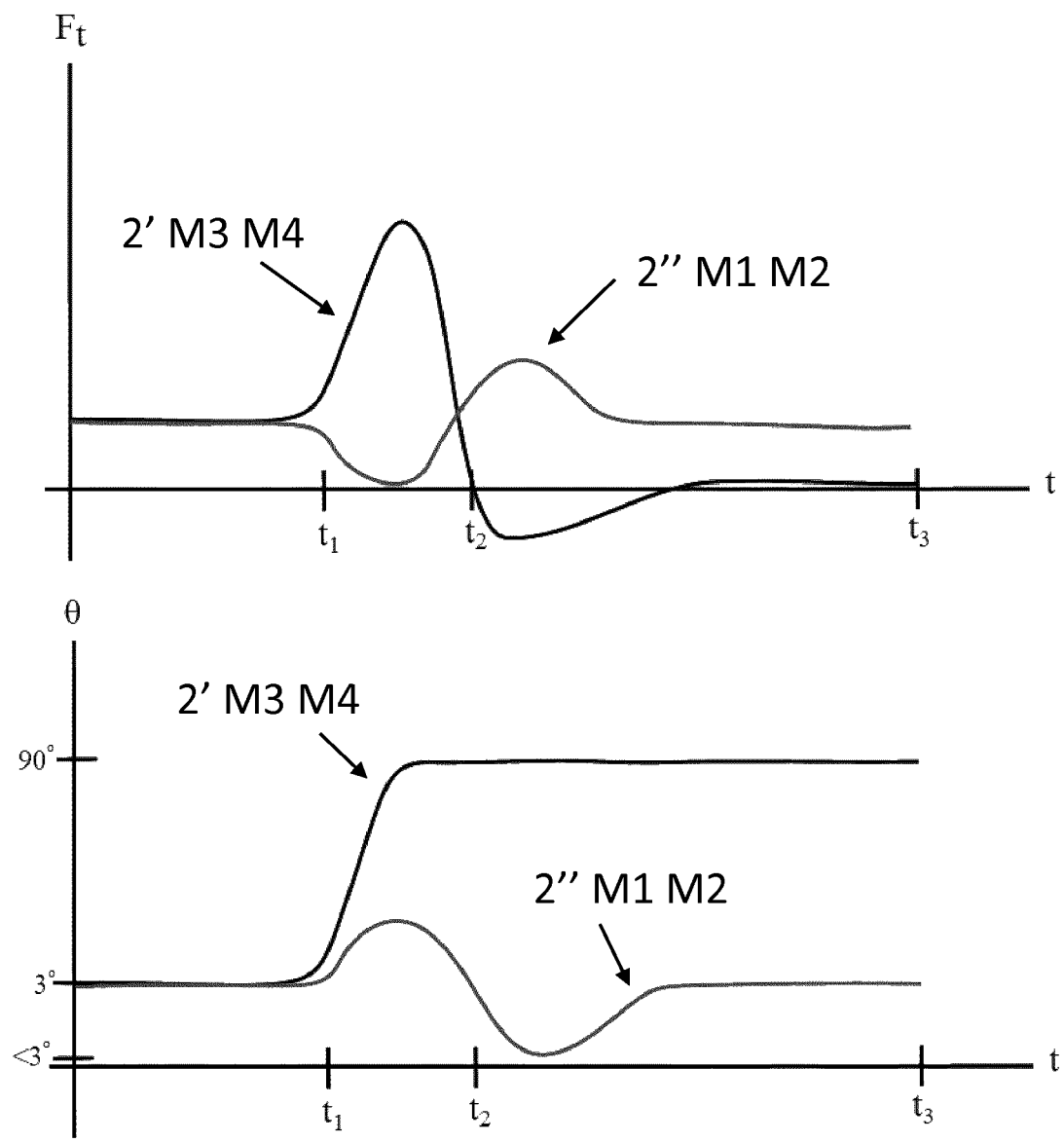

In one embodiment, the first subset 2' of wind turbine modules may, during the process of terminating of their power production, also be pitched so as to provide additional thrust control for actively dampen the oscillations of the support structure i.e. instead of just changing the pitch angle directly to a park position, e.g. 90 degrees as shown in FIGS. 5 and 6 below, the pitch angle of the first subset 2' may also be applied for thrust control management on their way to the parking position of the blades.

In the embodiment of FIG. 4, the first subset of wind turbine modules 2' for terminating power production is chosen as an uppermost subset of wind turbine modules 2 currently producing power. However, this need not be the case for all embodiments, though the uppermost subset of wind turbine modules is often exposed to the strongest winds in a typically vertical wind profile. However, the present invention may also be implemented so that the first subset of wind turbine modules 2' for terminating power production is chosen as the subset of wind turbine modules 2' whereupon the thrust force from the wind is currently maximum, relative to other wind turbine modules in the wind turbine system, in order to reduce loads on the wind turbine system in an advantageous way.

Thus, the trust force from the wind may be measured and/or estimated from one, or more, input parameters chosen from a non-limited group of:

a. an operating point of the respective wind turbine modules, b. a physical position of the respective wind turbine modules, preferably a lateral position, c. a wind speed at the respective wind turbine modules, d. a rotor speed at the respective wind turbine modules, e. a blade pitch value of the respective wind turbine modules, f. a power produced by the respective wind turbine modules, g. a thrust of the respective wind turbine modules, and/or h. a rotor torque of the respective wind turbine modules.

FIGS. 5 and 6 shows a graph of the pitching angle Θ and the thrust force F$_t$ for a shutdown without and with gust, or high wind, respectively, according to the present invention. Thus, in the illustrated embodiments, the thrust control TC is implemented with pitch control of the rotor blades 9 in the rotors 7 i.e. by rotating the blades around a longitudinal direction, e.g. with a pitching rate of 5-10 degrees per second, possibly around 15-25 degrees per second if faster change is required in the thrust control TC according to present invention.

In FIG. 5, the pitch angle Θ for the first subset 2' of wind turbine modules M3 and M4 is gradually changed from t$_1$ i.e. the time where the shutdown is initiated to around 90 degrees where the modules M3 and M4 are in a parking position, this also being known in the field as a so-called feathering position of the blades. During the shutdown process, it is evident that the thrust force F$_t$ on these modules M3 and M4 will be correspondingly reduced (and become negative after which a slight increase towards zero will occur), and a deflection of the tower will result as shown in FIG. 4. During this deflection, the second subset 2" of modules M1 and M2 is pitched from around 3 degrees to a lower angle to have a larger thrust force F$_t$ upon the support structure to oppose the deflection on other part 3' of the support structure where the modules M3 and M4 are positioned, cf. FIGS. 4A and 4B. Gradually, the thrust force F$_t$ from M1 and M2 is then reduced to a lower level at around time t$_2$ where the shutdown process for modules M3 and M4 has ended. At a later time t$_{end}$, the wind turbine modules M1 and M2 may then continue normal production, or they also may have their power production terminated. The time between t$_1$ and t$_2$ could be around 2-8 seconds for some wind turbine systems.

In FIG. 6, a situation similar to FIG. 5 is illustrated but in this embodiment, the wind turbine system 1 is simultaneously hit by a gust, or another extreme wind event, at the same time a shutdown process is performed. Thus, when the pitch angle Θ for the first subset 2' of wind turbine modules M3 and M4 is gradually changed at time t$_1$ to around 90 degrees in the parking position of the blades 9, the thrust force F$_t$ from the wind on the modules M3 and M4 will now instead rapidly increase as shown in graph. Thus, in order to counter this sudden increase in the effective thrust force on the support structure of the wind turbine system 1, the thrust force from the modules M1 and M2 is now managed so as to decrease their thrust force on the support structure by rapidly increase the pitch angle from around 3 degrees as shown in graph. Thus, the thrust force change may have different origins, at least a component directly related to the intended reduced power production during shutdown, and another component related to variations in the wind (here causing an increase in the thrust force despite the power reduction). In the context of the present invention, this distinction is important when implementing the opposing thrust force from the second subset of wind turbine modules. When the gust event is over before a later time t$_2$, the thrust force from the modules M1 and M2 is controlled so as to oppose, i.e. actively dampen, the oscillations resulting from the declining thrust force from M3 and M4. Thus, the thrust force from M1 and M2 following t$_2$ is managed to increase correspondingly to oppose the decline in the thrust force from M3 and M4 by decreasing the pitch angle for M1 and M2 as shown in the graph. Performing active damping of the deflection in the support structure will then be performed until a later time t3, where the support structure is sufficiently stable i.e. undesirable oscillations are removed, or reduced to a certain predefined level.

Figure 7:
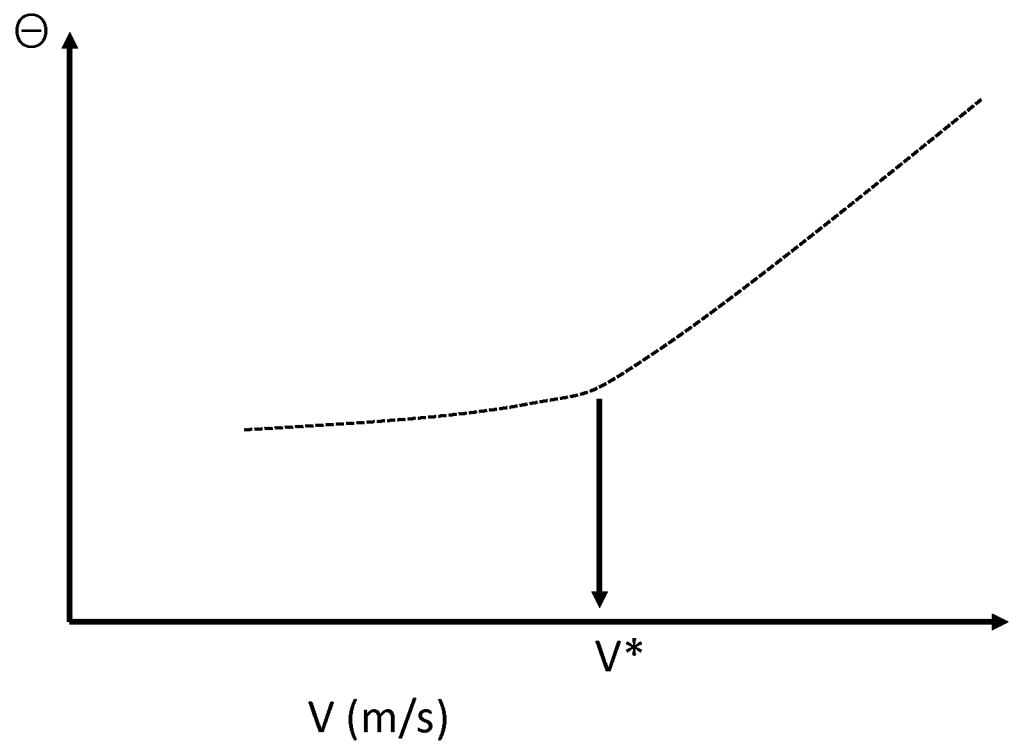
FIG. 7 shows a graph of the pitching angle versus the wind speed.

FIG. 7 shows a graph of the pitching angle versus the wind speed employed in the wind turbine modules according to the invention under normal power production. Thus, the wind turbine modules can be operated by appropriately controlling the pitch angle Θ by at lower speed in a slowly increasing way, whereas above a certain wind speed v* controlling the pitch angle Θ of the blades by a relatively larger increase as a function of the wind speed may be advantageous as illustrated. Thus, when performing thrust control of the second subset 2" of wind turbine modules, it is important that the aerodynamics of the blades 9 is sufficient understood and controlled to be able to deliver a positive, or negative, thrust force in a suitable size and with an accurate timing relative to the events occurring with the wind turbine system, e.g. gusts or similar.

Figure 8:
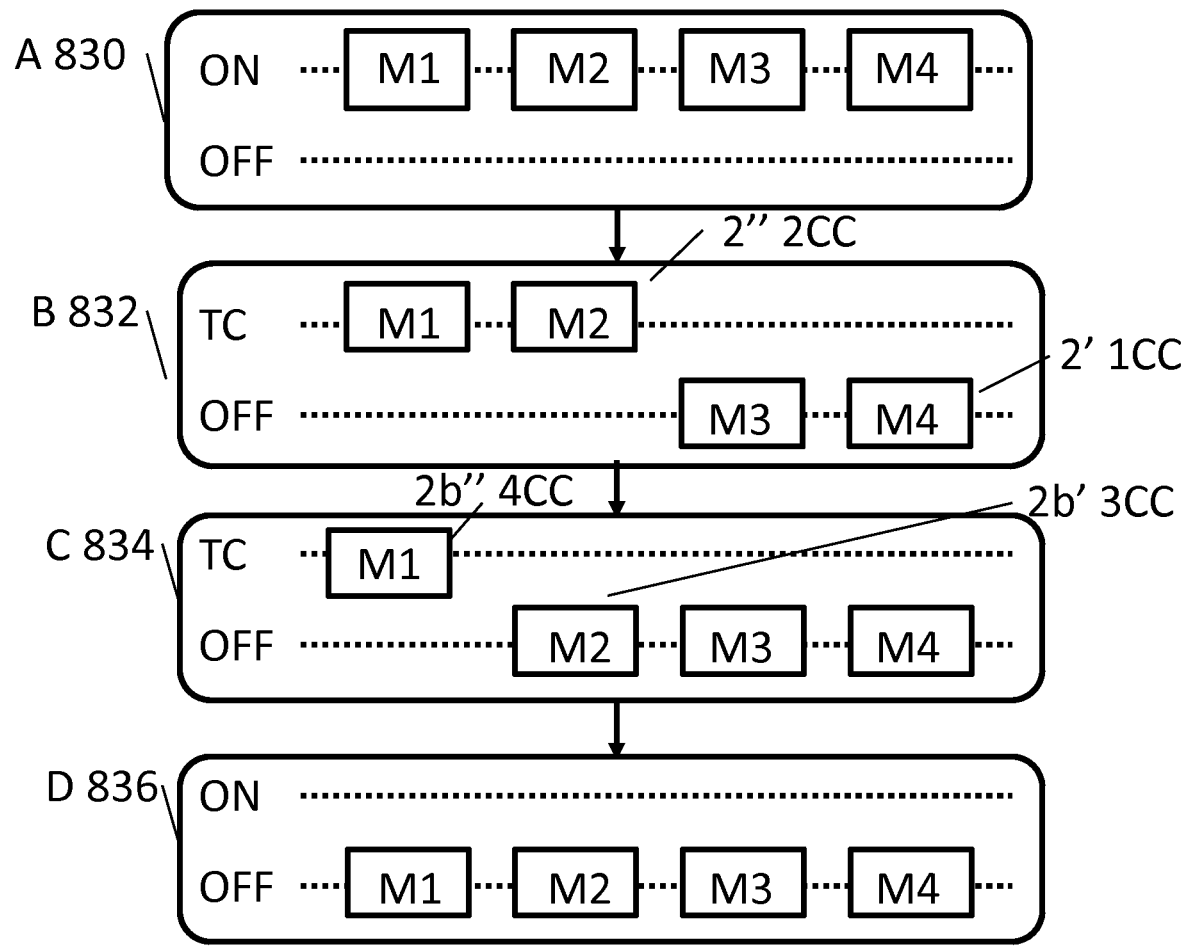
FIG. 8 shows a method for executing a shutdown procedure two times on a the wind turbine system according to the present invention.

FIG. 8 shows a method for executing a shutdown procedure two times on a the wind turbine system according to the present invention somewhat similar to FIG. 3, thus, in some embodiments, the invention may apply the first 1CC and the second 2CC control command a plurality of times but on different subsets of wind turbine modules from the plurality of wind turbine modules 2 in the wind turbine system 1, as it will be readily understood from the general principle and teaching of the present invention.

More specifically, as illustrated in FIG. 8 Step A 830, the four wind turbine modules M1-M4 may produce power as indicated by the state 'ON'. At a later time at Step B 832, there is applied a first control command 1CC to a first subset of wind turbine modules 2' M3 and M4 for terminating power production therefrom, as indicated by the state 'OFF', which results in a thrust force change with a reduced thrust force from the wind on a first part of the support structure carrying the said first subset of wind turbine modules 2' M3 and M4. Thereafter, the invention applies a second control command 2CC to a second subset of wind turbine modules 2" M1 and M2 positioned at a different position relative to the first subset of wind turbine modules 2', the second control command enabling thrust control TC of the second subset of wind turbine modules 2" to oppose the said thrust force change.

The shutdown procedure further comprises the Step C 834, wherein there is applied a third control command 3CC to a third subset of wind turbine modules 2b' M2 being now also in non-power producing state 'OFF', the third subset of wind turbine modules being different from said first subset 2' of wind turbine modules. Thus, this step terminates power production from the third subset 2b' resulting in a thrust force change with a reduced thrust force from the wind on a third part of the support structure carrying the third subset of wind turbine modules 2b' M2.

In response thereto, the shutdown procedure further comprises applying a fourth control command 4CC to fourth subset of wind turbine modules 2b" M1, as schematically indicated with only M1 being in the state 'TC'. Optionally, the module M1 may be positioned at a different vertical and/or horizontal position relative to the third subset of wind turbine modules 2b', the fourth control command enabling thrust control TC of the fourth subset of wind turbine modules 2b" M1 to oppose said thrust change on the third part of the support structure, similarly to the principle of the invention applied for the first and second control command.

In the illustrated embodiment of FIG. 8, the fourth subset of wind turbine modules 2b" M1 is partially overlapping with said second subset 2"—being equal to M1 and M2—of wind turbine modules for providing a gradually way of shutting down the wind turbine system, but alternatively the fourth subset of wind turbine modules 2b" may not be overlapping with said second subset 2" of wind turbine modules.

Beneficially, applying of the first 1CC and the second 2CC control command, and/or the third 3CC and the fourth 4CC control command, are performed until all the wind turbine modules M1-M4 have terminated their power production and/or until the support structure is sufficiently stable i.e. undesirable oscillations are removed, or reduced to a certain predefined level.

Figure 9:
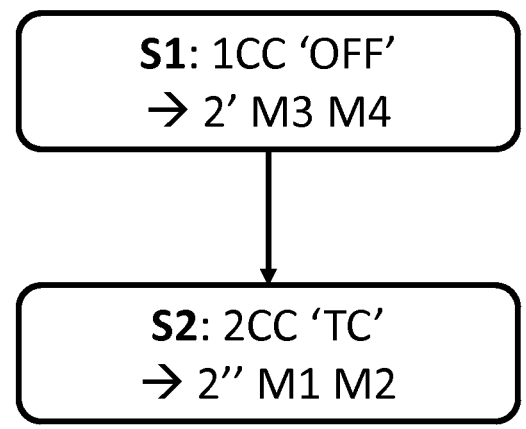
FIG. 9 is a flow chart for illustrating a method according to the present invention.

FIG. 9 is a flow chart for illustrating a method according to the present invention. The method is applied executing a wind turbine system transition from an active state of power production to inactive state with a shutdown procedure, the wind turbine system 1 comprising, cf. FIGS. 1 and 2:
  a support structure 3,
  a plurality of wind turbine modules 2 mounted to the support structure 3 wherein each of the plurality of wind turbine modules comprises a rotor 7, and
  a control system 20,
  wherein the method comprises, simultaneously (wholly or partly) or consecutively (in both orders), the steps of, cf. FIGS. 3 and 9:
  S1 applying a first control command 1CC to a first subset of wind turbine modules 2' for terminating power production therefrom resulting in a thrust force change with a reduced thrust force from the wind on a first part 3' of the support structure carrying the said first subset of wind turbine modules 2', and
  S2 applying a second control command 2CC to a second subset of wind turbine modules 2" positioned at a different position relative to the first subset of wind turbine modules 2', the second control command enabling thrust control TC of the second subset of wind turbine modules 2" to oppose the said thrust force change.

In a general embodiments there is presented:
  A wind turbine system (1), wherein the wind turbine system is comprising:
    a support structure (3),
    a plurality of wind turbine modules (2) mounted to the support structure (3) wherein each of the plurality of wind turbine modules comprises a rotor (7),
    a control system (20),
  wherein the control system (20) is arranged to execute a shutdown procedure, the shutdown procedure comprising:
    applying a first control command (1CC) to a first subset of wind turbine modules (2') for terminating power production therefrom resulting in a thrust force change with a reduced thrust force from the wind on a first part (3') of the support structure carrying the said first subset of wind turbine modules (2'), and
    applying a second control command (2CC) to a second subset of wind turbine modules (2") positioned at a different position relative to the first subset of wind turbine modules (2'), the second control command enabling thrust control (TC) of the second subset of wind turbine modules (2") to oppose the said thrust force change.

This general embodiment can be combined with any of the further embodiments disclosed herein.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A wind turbine system comprising:
   a support structure including a tower,
   a plurality of wind turbine modules mounted to the support structure wherein each of the plurality of wind turbine modules comprises a rotor,
   a computer system configured to execute a shutdown procedure comprising:
       adjusting, at a first time, a pitch of a first subset of wind turbine modules for terminating power production therefrom resulting in a thrust force change on a first part of the support structure carrying the said first subset of wind turbine modules;
       adjusting, at the first time, a pitch of a second subset of wind turbine modules positioned at a different position relative to the first subset of wind turbine modules to decrease a thrust of the second subset of the wind turbine modules to oppose a change in bending moment around a root of the tower resulting from the said thrust force change; and
       adjusting, at a second time after the first time and before power production of the first subset of wind turbine modules is completely terminated, the pitch of the second subset of wind turbine modules to increase a thrust of the second subset of the wind turbine modules.

2. The wind turbine system according to claim 1, wherein the second subset of wind turbine modules is positioned at a different vertical position relative to the first subset of wind turbine modules.

3. The wind turbine system according to claim 1, wherein the second subset of wind turbine modules is positioned at a different horizontal position relative to the first subset of wind turbine modules.

4. The wind turbine system according to claim 1, wherein adjusting the pitch of the second subset of wind turbine modules actively dampens oscillations of the first part of the support structure carrying the said first subset of wind turbine modules.

5. The wind turbine system according to claim 4, wherein adjusting the pitch of the first subset of wind turbine modules provides additional thrust control to actively dampen said oscillations.

6. The wind turbine system according to claim 1, the shutdown procedure further comprises:
   applying a first control command to a third subset of wind turbine modules for terminating power production from the third subset resulting in a thrust force change with a reduced thrust force from the wind on a third part of the support structure carrying the third subset of wind turbine modules, the third subset of wind turbine modules being different from said first subset of wind turbine modules, and
   applying a second control command to a fourth subset of wind turbine modules positioned at a different vertical position relative to the third subset of wind turbine modules, the second control command enabling thrust control of the fourth subset of wind turbine modules to oppose said thrust force change on the third part of the support structure.

7. The wind turbine system according to claim 6, wherein the fourth subset of wind turbine modules is partially overlapping with said second subset of wind turbine modules.

8. The wind turbine system according to claim 6, wherein applying the first and the second control command is performed until all of the plurality of wind turbine modules have terminated their power production.

9. The wind turbine system according to claim 6, wherein the first subset of wind turbine modules or the third subset of wind turbine modules is chosen as an uppermost subset of wind turbine modules currently producing power.

10. The wind turbine system according to claim 6, wherein the first subset of wind turbine modules or the third subset of wind turbine modules is chosen as a subset of wind turbine modules whereupon the thrust force from the wind is currently maximum, relative to other wind turbine modules in the wind turbine system.

11. The wind turbine system according to claim 10, wherein the thrust force from the wind is measured or estimated from one, or more, input parameters chosen from a group of:
   a. an operating point of the respective wind turbine modules,
   b. a physical position of the respective wind turbine modules,
   c. a wind speed at the respective wind turbine modules,
   d. a rotor speed at the respective wind turbine modules,
   e. a blade pitch value of the respective wind turbine modules,
   f. a power produced by the respective wind turbine modules,
   g. a thrust of the respective wind turbine modules, or
   h. a rotor torque of the respective wind turbine modules.

12. The wind turbine system according to claim 6, wherein the second control command is applied to actively dampen corresponding parts of the support structure until a deviation from an equilibrium position has reached a predefined level.

13. The wind turbine system according to claim 1, wherein adjusting the pitch of the second subset of wind turbine modules causes a corresponding displacement of a part of the support structure carrying the second subset of wind turbine modules when actively dampening thrust force on the first part of the support structure.

14. The wind turbine system according to claim 1, wherein:
   the first subset of wind turbine modules comprises a plurality of wind turbine modules, and
   the second subset of wind turbine modules comprises a plurality of wind turbine modules.

15. A method for executing a wind turbine system transition from an active state of power production to inactive state with a shutdown procedure, the wind turbine system comprising:
   a support structure including a tower,
   a plurality of wind turbine modules mounted to the support structure wherein each of the plurality of wind turbine modules comprises a rotor, and
   a computer system, wherein the method comprises:
       adjusting, at a first time, a pitch of a first subset of wind turbine modules for terminating power production therefrom resulting in a thrust force change on a first part of the support structure carrying the said first subset of wind turbine modules;
       adjusting, at the first time, a pitch of a second subset of wind turbine modules positioned at a different position relative to the first subset of wind turbine modules to decrease a thrust of the second subset of the wind turbine modules to oppose a change in bending moment around a root of the tower resulting from the said thrust force change; and adjusting, at a second time after the first time and before power production of the first subset of wind turbine modules is completely terminated, the pitch of the second subset of wind turbine modules to increase a thrust of the second subset of the wind turbine modules.

* * * * *